United States Patent

Balmer

[11] Patent Number: 5,950,933
[45] Date of Patent: Sep. 14, 1999

[54] APPARATUS FOR SPREADING PARTICULATE MATERIALS HAVING DIFFERENT COMPONENTS

[76] Inventor: Charles Balmer, Box 100, Elie Manitoba, Canada, R0H 0H0

[21] Appl. No.: 09/020,575

[22] Filed: Jan. 29, 1998

[51] Int. Cl.⁶ .................................................. A01C 15/04
[52] U.S. Cl. ........................... 239/655; 239/656; 239/676
[58] Field of Search ..................................... 239/654–656, 239/662–664, 670–673, 676, 689

[56] References Cited

U.S. PATENT DOCUMENTS

| | | | |
|---|---|---|---|
| 4,162,766 | 7/1979 | Ten Broeok et al. | 239/656 |
| 4,296,695 | 10/1981 | Quanbeck | 239/655 X |
| 4,852,809 | 8/1989 | Davis et al. | 239/654 |
| 5,052,627 | 10/1991 | Balmer . | |

FOREIGN PATENT DOCUMENTS

| | | | |
|---|---|---|---|
| 1214004 | 2/1986 | U.S.S.R. | 239/656 |
| 1435176 | 5/1976 | United Kingdom | 239/655 |

Primary Examiner—Kevin Weldon
Attorney, Agent, or Firm—Adrian D. Battison; Murray E. Thrift

[57] ABSTRACT

A pneumatic material spreader for distributing two types of particulate fertilizers at once including an outwardly extending boom having a plurality of pipes, a hopper with plural compartments and conveyor system. The conveyor system comprises two sets of stacked conveyors each set having one conveyor transporting material for one compartment to the pneumatic spray boom and a second conveyor transporting material from a second compartment to the same pneumatic spray boom. Guide ducts receive the material form the conveyors which become mixed as they pass through the separating guide ducts into the pipes and out to an outlet. The hopper is separated into two compartments by a divider wall that is adjustable to permit the relative size of the compartments to be varied.

12 Claims, 4 Drawing Sheets

APPARATUS FOR SPREADING PARTICULATE MATERIALS HAVING DIFFERENT COMPONENTS

The invention relates to an apparatus for spreading particulate material which allows simultaneous spreading of different components.

BACKGROUND OF THE INVENTION

In prior U.S. Pat. No. 5,052,627 of the present inventor issued Oct. 1, 1991 is disclosed a machine for spreading particulate material and particularly, but not exclusively, granular fertilizer in an agricultural situation. This machine includes a tank arranged to be mounted on a suitable transportation vehicle. At one end of the tank which is either the front end or the back end is mounted a pair of booms with each boom extending outwardly to a respective side of the tank for movement with the vehicle across the ground. Each boom includes a series of pipes which are horizontal and arranged either in a single row or in two rows so that the pipes are connected side by side. The tank has a pair of belts extending longitudinally of the tank side by side in a common horizontal plane. Each belt feeds out of the end of the tank for discharging material carried on the upper run of the belt into a guide duct system positioned underneath the end of the belt. The guide duct system includes a plurality of ducts equal to the number of pipes and arranged side by side across the width of the discharge end of the belt. The guide duct system thus receives portions of the material from different positions across the width of the belt and transfers that portion of material to a respective one of the pipes. The inner end of the pipes are connected to a manifold so that air from a fan blows through the pipes to carry the portion of material along the respective pipe to a spreader system at the end of the pipe. The spreader system can in some cases include two separate spreaders one directly at the end and one spaced inwardly from the end so as to split the material at the two separate spreaders thus reducing the number of individual pipes.

This machine has achieved considerable commercial success and is widely sold in North America.

The above patent also discloses a system for adding one or more additional components to the first component from the tank. Thus the belt carries the first component out of the tank using a gate at the exit of the tank for levelling the material on the belt at a predetermined thickness. Two further tanks are provided each of which has an individual metering system which meters an additional component from the additional tank onto the top of the same belt so that the same belt carries the additional material with the first material from the main tank to the guide system for discharge of the portions into the separate ducts of the guide system.

However the machine described above using the supplemental tanks does not provide sufficient flexibility of the materials to be supplied by the belt to accommodate the variations in the components of the fertilizer which are desired for modern agriculture.

SUMMARY OF THE INVENTION

It is one object of the present invention, therefore, to provide an improved apparatus for spreading particulate material which allows simultaneous spreading of different components.

According to the invention there is provided an apparatus for spreading particulate material across the ground comprising:

a central tank for containing the material to be spread;

a first boom and a second boom;

each boom extending from a position adjacent one end of the tank outwardly to a respective side of the tank;

each boom including a plurality of pipes with each pipe extending from an inner end adjacent the tank to an outer end spaced outwardly of the tank and having a material spreader spaced outwardly from the central position for spreading across the ground the particulate material transported along the pipe;

the tank and the booms being mounted on a vehicle for transportation across the ground in a direction substantially at right angles to the booms;

the spreaders being located at staggered positions along the length of the booms such that the spreaders cooperate to spread the material across the width of the booms as the booms are moved across the ground;

a fan for generating airflow;

a manifold communicating airflow from the fan to each pipe for causing an airflow therealong from the inner end thereof to the spreader for transportation of the particulate material therealong;

each of the pipes of a respective one of the booms having a feed opening for receiving particulate material metered from the tank;

first and second guide members each for feeding the material metered from the tank into the feed openings of respective one of the booms, the tank being divided by a transverse dividing wall into a first compartment adjacent said one end and a second compartment spaced from said one end;

said first guide member having associated therewith a first and a second endless feed belt each extending longitudinally of the tank to a discharge end projecting outwardly from said one end of the tank for discharging into the first guide member;

each of said first and second feed belts having an upper run mounted within the tank such that particulate material from the tank is carried with the upper run of the belt from the tank in a layer;

the first belt extending from said discharge end along the tank into the first compartment only for receiving particulate material from the first compartment only such that an end opposite to the discharge end does not extend into the second compartment;

the second belt being mounted below the first belt and extending underneath the first compartment into the second compartment for receiving particulate material from the second compartment only;

the first and second belts being of the same width with side edges thereof at least at the discharge ends aligned in common vertical planes;

said second guide member having associated therewith a third and a fourth endless feed belt each extending longitudinally of the tank to a discharge end projecting outwardly from said one end of the tank for discharging into the second guide member;

each of said third and fourth feed belts having an upper run mounted within the tank such that particulate material from the tank is carried with the upper run of the belt from the tank in a layer;

the third belt extending from said discharge end along the tank into the first compartment only for receiving particulate material from the first compartment only such that an end opposite to the discharge end does not extend into the second compartment;

the fourth belt being mounted below the third belt and extending underneath the first compartment into the second compartment for receiving particulate material from the second compartment only;

the third and fourth belts being of the same width with side edges thereof at least at the discharge ends aligned in common vertical planes;

the first and third belts being arranged such that the upper runs thereof lie in substantially the same first plane for movement in mutually parallel directions outwardly from the tank at said one end thereof and at right angles to said booms;

the second and fourth belts being arranged such that the upper runs thereof lie in substantially the same second plane below the first plane for movement in mutually parallel directions outwardly from the tank at said one end thereof and at right angles to said booms;

each belt having a gate for controlling the depth of the layer on the belt so as to meter the amount of material carried thereby;

each of said belts having an end guide member at the discharge end of the belt around which the upper run thereof turns to discharge the material to fall therefrom by gravity into the respective guide member.

Preferably the opposite end of each of the first and third belts is arranged at the transverse dividing wall.

Preferably each of the first and second compartments includes a pair of parallel channels therein each receiving a respective one of the belts, each channel having side walls inclined inwardly and downwardly toward the respective belt.

Preferably the side walls of the channels are bridged by cover members acting to support the material off the belt and to allow material to access the belt between the cover members only.

Preferably the transverse dividing wall is pivotal in a direction longitudinally of the tank about a lower edge of the dividing wall so as to increase and decrease respectively the size of the compartments.

Preferably the upper run of each of the belts runs over a bottom pan of the respective compartment.

Preferably the lower run of each of the first and third belts runs below the respective pan and above the upper run of the second and fourth belts respectively.

Preferably the first and third belts have the discharge ends thereof arranged at a position spaced from the adjacent end of the tank by a distance less than the distance of the discharge ends of the second and fourth belts.

Preferably each of the guide members comprises a plurality of receiving chambers at spaced positions across the width of the belts each for receiving a portion of the material discharged from the belts and a plurality of guide ducts each guiding the material from a respective one of the receiving chambers to a respective one of the pipes.

Preferably the guide ducts are rigid.

Preferably for each of the booms, the feed openings of the pipes thereof are staggered in a direction parallel to the booms.

Preferably the guide ducts are arranged side by side, each guide duct communicating material directly to the feed opening of a respective one of the pipes and being formed by two side dividing walls separating each guide duct from the next adjacent guide duct and two end walls, the side dividing walls and end walls defining the receiving chamber at an upper end of the guide duct into which the material falls from the discharge end, the side walls being arranged in spaced relation transversely to the discharge end so that the discharged material is divided into separate portions for transmission to the pipes, the end walls of each duct member including at least one end wall which is inclined to the vertical to guide the separate portion of material from a position directly beneath the discharge end to a position aligned with the feed opening of the respective pipe.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
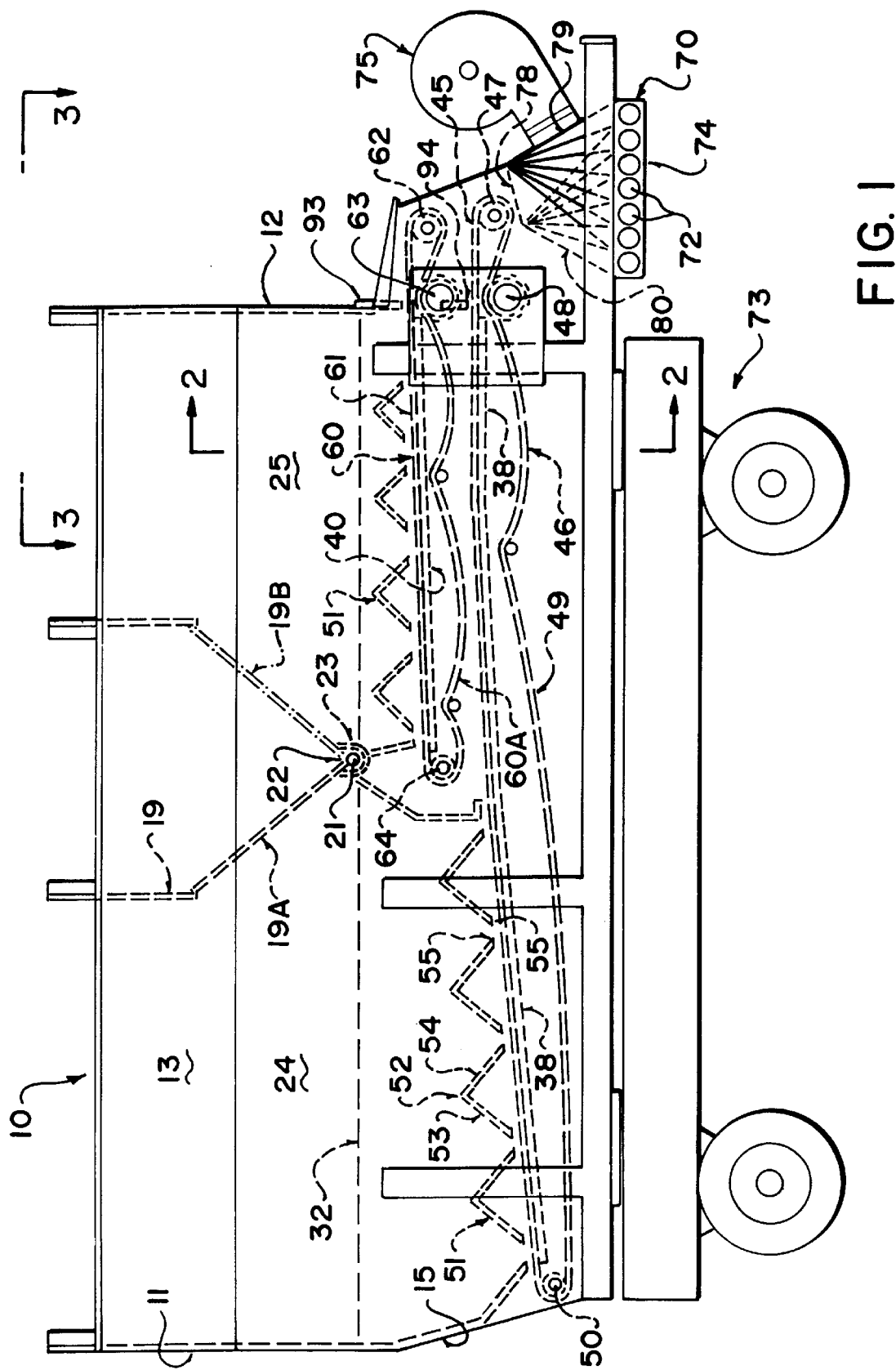
FIG. 1 is a side elevational view of an apparatus for distributing particulate materials according to the present invention.

Reference is made to U.S. Pat. No. 5,052,627 of the present inventor and mentioned above. The apparatus of the present invention as described in detail hereinafter utilizes many techniques and arrangements as described in the above patent so that those features which are common to the above patent are not necessarily described fully herein. The disclosure of the above patent is therefore incorporated herein by reference for the purposes of providing further detail if required by the reader.

The apparatus of the present invention comprises a tank 10 having a first vertical end wall 11 and a second vertical end wall 12. The tank further has two vertical side walls 13 and 14. Below the end wall 11 is provided an inwardly and downwardly converging hopper bottom wall 15 so as to direct the particulate material downwardly and inwardly for discharge from the container. Similarly the side walls underneath the vertical section have side hopper bottom wall portions 17 and 18 which also converge inwardly and downwardly.

The tank is divided into two sections by a divider wall 19. The divider wall 19 can pivot between two positions indicated at 19A and 19B. In the positions 19A and 19B the divider wall is inclined either to the left or to the right as shown. The divider wall pivots about an axis 21 at the base of the divider wall with a bottom edge of the divider wall including a cylindrical divider rod 22 which sits in a part cylindrical receptacle 23. The divider wall 19 is shaped to match the inside surface of the tank so that it provides a sealed panel dividing a first compartment 24 on one side of the divider wall from a second compartment 25 on the opposite side of the divider wall. The movement of the panel acts to change the dimensions of the compartment 24 and 25 relative to each other.

Along the centre of the tank is provided a divider section 31 having an upper apex 32 and a pair of downwardly and outwardly extending side walls 33 and 34. The side walls 33 and 34 thus converge toward a respective one of the side walls 17 and 18 to form a channel 35, 36 along the centre of the tank. At the bottom of the side walls is a rectangular chamber defined by vertical side walls 35A, 35B of the channel 35 and 36A and 36B of the channel 36 and closed by a horizontal bottom pan 37, 38 which extends across to close the bottom of the channel 35, 36. As shown in FIG. 1, the pan 37, 38 extends along the full length of the tank and is inclined slightly upwardly from the end 11 of the tank toward the end 12. Above each of the pans 37, 38 is provided a second pan 39, 40.

As each side of the tank is identical, the following description refers only to one side including the pans 38 and 40. The pan 40 commences directly underneath the receptacle 23 and extends therefrom slightly upwardly at an incline similar to that of the pan 38 to an end of the tank at the end 12. The pan 40 connects to respective ones of the side walls 36A and 36B and thus the bottom of the compartment 25 is closed off by the pan 40 so that material cannot fall from the compartment 25 onto the pan 38. The pans 38 and 40 are of the same width.

On top of the pan 38 is provided the upper run 45 of a belt 46 which slides along the pan 38 moving from the end 11 though the end 12. The belt wraps over a guide roller 47 at a discharge end of the belt after it is emerged from the end of the pan 38. The belt is pulled around the guide roller 47 by a drive roller 48. A return run 49 of the belt extends along underneath the pan 38 and wraps around a guide surface 50 at the end of the pan 38.

Above the belt and bridging each of the channels 36 is provided a plurality of support members 51, each of which comprises an upper apex 52 and a pair of depending wall 53 and 54 which diverge outwardly and downwardly from the apex. Each wall 53, 54 terminates at a bottom edge 55 spaced upwardly from the belt. The bottom edge 55 of one support member is spaced from the bottom edge 55 of the next by a distant sufficient to allow material to slide downwardly within the compartment onto the belt to be carried by the belt underneath support members toward the discharge end. The support members carry most of the weight of the material from the compartment so that the weight does not prevent proper sliding movement of the belt over the pan. Above the pan 40 in the compartment 25 is provided a plurality of the support members 51 which operate in the same manner as previously described.

A further belt 60 similar to and vertically above a respective one of the belts 46 is located in a respective one of the channels 35, 36 at the bottom of the compartment 25. Thus each of the belts 60 has an upper run 61 passing over the top of the pan 40. Each of the belt 60 has a discharge roller 62 and a drive roller 63. A lower run or return run 60A of each of the belts 60 passes underneath the upper run and in the area underneath the pan 40 and above the belt 46. A guide surface 64 is arranged directly underneath the receptacle 23.

Thus the first belt 60 acts to carry material out of the compartment 25 and the second belt 46 carries the material out of the compartment 24.

The discharge roller 62 of the belt 60 is located above the roller 47 but spaced to the left as shown in FIG. 1. Thus the roller 47 projects further out of the tank.

Figure 2:
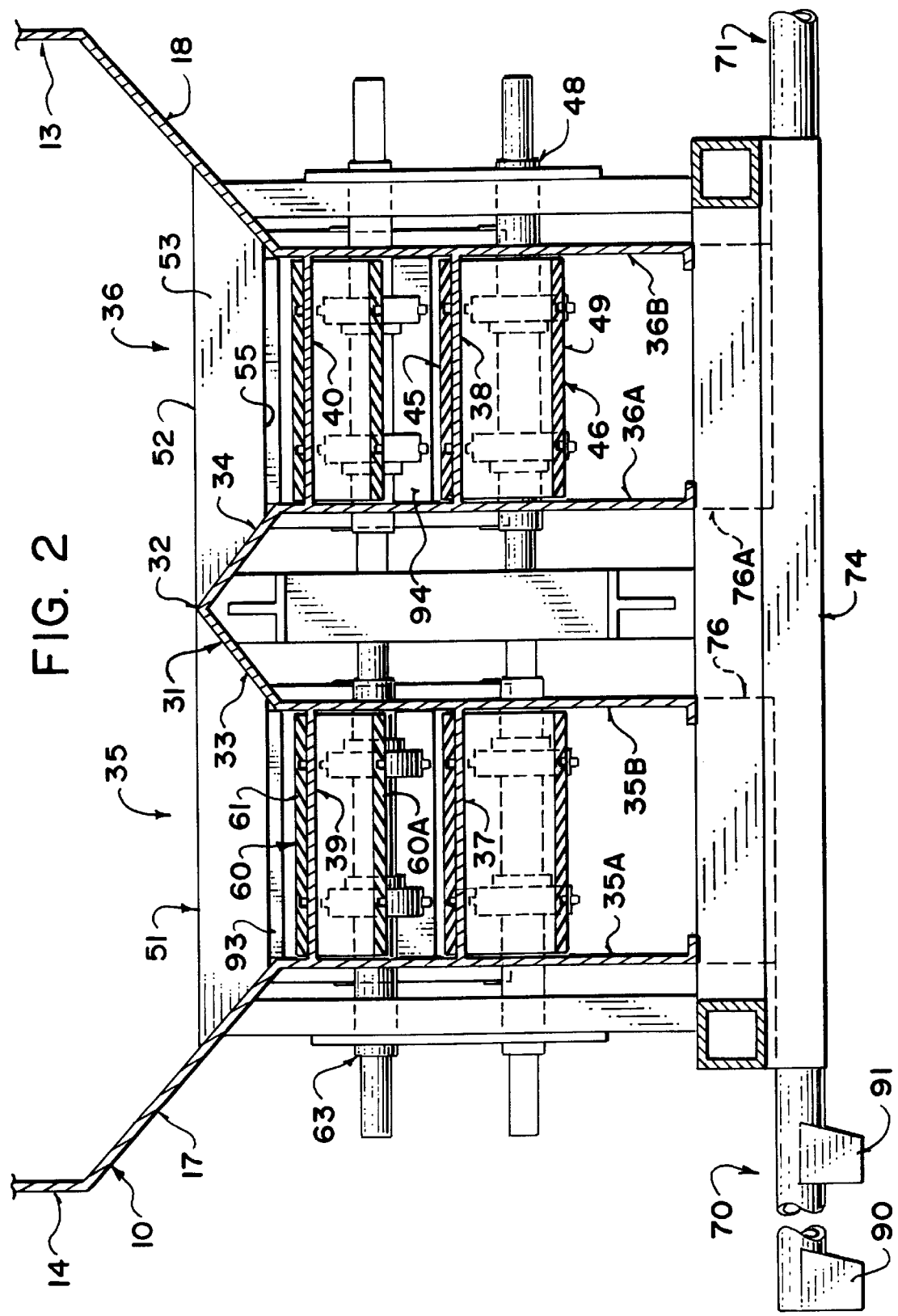
FIG. 2 is a cross-sectional view along the lines 2—2 of FIG. 1.
Figure 3:
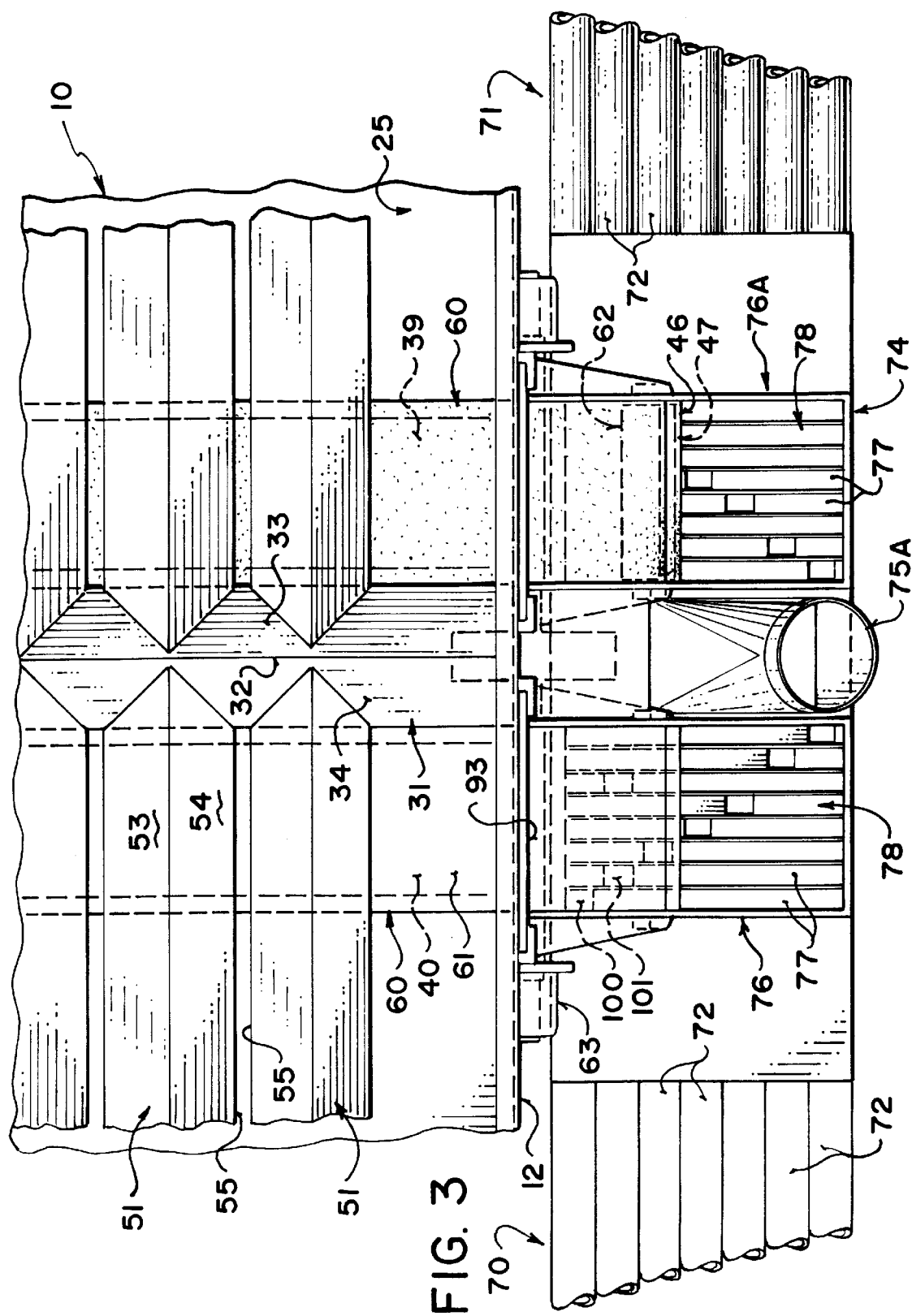
FIG. 3 is a cross-sectional view along the lines 3—3 of FIG. 1.
Figure 4:
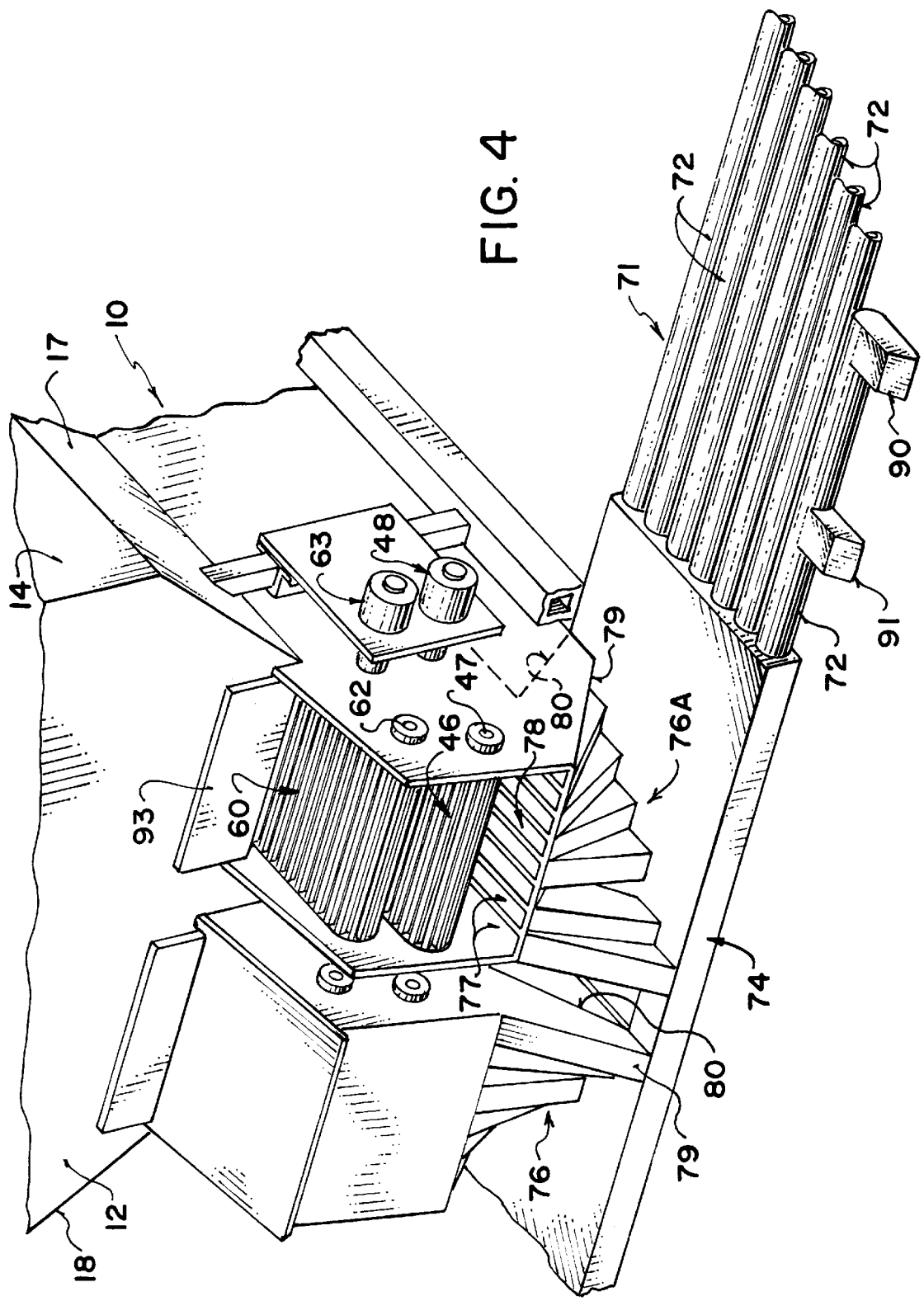
FIG. 4 is an iaometric view of the apparatus of FIG. 1.

The belts are of the same width and as shown in FIG. 2, the side edges of the belts lie in common vertical planes so that the belts are directly aligned one above the other. The two upper belts from the compartment 25 lie in the same generally horizontal plane and the two lower belts lie in the same lower generally horizontal plane.

The apparatus further comprises two booms 70 and 71 each comprising a plurality of pipes 72 arranged in a common horizontal plane. Each boom extends outwardly to a respective side of the tank so that the tank is moved forwardly on a suitable transportation vehicle schematically indicated at 73, the booms move at right angles to their length.

A fan 75 directs air into a manifold 74 underneath and between the booms. Each boom is associated with a respective one of two guide members 76 and 76A which receive the material discharge from the belts 60 and 46 and direct the material received into the respective boom and particularly the pipes thereof. Each guide member comprises a series of guide ducts 77 arranged side by side across the width of the end of the belts so that each guide duct receives a portion of the material discharged from the belts. Each guide duct communicates with a respective one of the pipes. Each guide duct has a mouth or receptacle chamber 78 at its upper end into which the material is discharged. From that upper chamber, the guide duct includes rigid end walls 79,80 which converge toward the respective pipe. Thus one of the end walls is inclined downwardly and across the open mouth toward the pipe to carry the material into the pipe.

The guide members are substantially of the construction described in the above patent and therefore further detail will not be included at this point and reference can be made to that patent for such further detail if required.

The tank having two separate compartments 24 and 25 therefore allows mixing of different components of fertilizer at a rate which is determined in accordance with the requirements of the land to be fertilized. Instead of therefore supplying the fertilizer in admixture form, two separate components can be supplied in a separate compartments and the materials fed and mixed within the pipe system of the booms. The two separate belts allow the material to be effectively transported from the two compartments.

The pipes each carry one or two spreaders at an end outwardly of the tank and the spreaders of the pipes are staggered across the width of the booms as indicated at 90,91. The amount of material on the belts is controlled by adjustable gates 93,94 at the exit of the tank.

The guide ducts 77 of the guide members 76 and 76A are arranged side by side, each guide duct communicating material directly to the feed opening of a respective one of the pipes and being formed by two vertical side dividing walls separating each guide duct from the next adjacent guide duct and the two end walls 79,80, the side dividing walls and end walls 79,80 defining the receiving chamber at an upper end of the guide duct into which the material falls from the discharge end of the two aligned belts. The side walls are arranged in spaced relation transversely to the discharge end of the belts so that the discharged material is divided into separate portions for transmission to the pipes. The end walls 79,80 of each duct member including at least one end wall which is inclined to the vertical to guide the separate portion of material from a position directly beneath the discharge end to a position aligned with the staggered feed openings 100, 101 et seq of the respective pipes.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for spreading particulate material across the ground comprising:

a central tank for containing the material to be spread;

a first boom and a second boom;

each boom extending from a position adjacent one end of the tank outwardly to a respective side of the tank;

each boom including a plurality of pipes with each pipe extending from an inner end adjacent the tank to an outer end spaced outwardly of the tank and having a material spreader spaced outwardly from the central position for spreading across the ground the particulate material transported along the pipe;

the tank and the booms being mounted on a vehicle for transportation across the ground in a direction substantially at right angles to the booms;

the spreaders being located at staggered positions along the length of the booms such that the spreaders cooperate to spread the material across the width of the booms as the booms are moved across the ground;

a fan for generating airflow;

a manifold communicating airflow from the fan to each pipe for causing an airflow therealong from the inner end thereof to the spreader for transportation of the particulate material therealong;

each of the pipes of a respective one of the booms having a feed opening for receiving particulate material metered from the tank;

first and second guide members each for feeding the material metered from the tank into the feed openings of respective one of the booms, the tank being divided by a transverse dividing wall into a first compartment adjacent said one end and a second compartment spaced from said one end;

said first guide member having associated therewith a first and a second endless feed belt each extending longitudinally of the tank to a discharge end projecting outwardly from said one end of the tank for discharging into the first guide member;

each of said first and second feed belts having an upper run mounted within the tank such that particulate material from the tank is carried with the upper run of the belt from the tank in a layer;

the first belt extending from said discharge end along the tank into the first compartment only for receiving particulate material from the first compartment only such that an end opposite to the discharge end does not extend into the second compartment;

the second belt being mounted below the first belt and extending underneath the first compartment into the second compartment for receiving particulate material from the second compartment only;

the first and second belts being of the same width with side edges thereof at least at the discharge ends aligned in common vertical planes;

said second guide member having associated therewith a third and a fourth endless feed belt each extending longitudinally of the tank to a discharge end projecting outwardly from said one end of the tank for discharging into the second guide member;

each of said third and fourth feed belts having an upper run mounted within the tank such that particulate material from the tank is carried with the upper run of the belt from the tank in a layer;

the third belt extending from said discharge end along the tank into the first compartment only for receiving particulate material from the first compartment only such that an end opposite to the discharge end does not extend into the second compartment;

the fourth belt being mounted below the third belt and extending underneath the first compartment into the second compartment for receiving particulate material from the second compartment only;

the third and fourth belts being of the same width with side edges thereof at least at the discharge ends aligned in common vertical planes;

the first and third belts being arranged such that the upper runs thereof lie in substantially the same first plane for movement in mutually parallel directions outwardly from the tank at said one end thereof and at right angles to said booms;

the second and fourth belts being arranged such that the upper runs thereof lie in substantially the same second plane below the first plane for movement in mutually parallel directions outwardly from the tank at said one end thereof and at right angles to said booms;

each belt having a gate for controlling the depth of the layer on the belt so as to meter the amount of material carried thereby;

each of said belts having an end guide member at the discharge end of the belt around which the upper run thereof turns to discharge the material to fall therefrom by gravity into the respective guide member.

2. The apparatus according to claim 1 wherein the opposite end of each of the first and third belts is arranged at the transverse dividing wall.

3. The apparatus according to claim 1 wherein each of the first and second compartments includes a pair of parallel channels therein each receiving a respective one of the belts, each channel having vertical side walls.

4. The apparatus according to claim 1 wherein the side walls of the channels are bridged by cover members acting to support the material off the belt and to allow material to access the belt between the cover members only.

5. The apparatus according to claim 1 wherein the transverse dividing wall is pivotal in a direction longitudinally of the tank about a lower edge of the dividing wall so as to increase and decrease respectively the size of the compartments.

6. The apparatus according to claim 1 wherein the upper run of each of the belts runs over a bottom pan of the respective compartment.

7. The apparatus according to claim 6 wherein the lower run of each of the first and third belts runs below the respective pan and above the upper run of the second and fourth belts respectively.

8. The apparatus according to claim 1 wherein the first and third belts have the discharge ends thereof arranged at a position spaced from the adjacent end of the tank by a distance less than the distance of the discharge ends of the second and fourth belts.

9. The apparatus according to claim 1 wherein each of the guide members comprises a plurality of receiving chambers at spaced positions across the width of the belts each for receiving a portion of the material discharged from the belts and a plurality of guide ducts each guiding the material from a respective one of the receiving chambers to a respective one of the pipes.

10. The apparatus according to claim 9 wherein the guide ducts are rigid.

11. The apparatus according to claim 10 wherein for each of the booms, the feed openings of the pipes thereof are staggered in a direction parallel to the booms.

12. The apparatus according to claim 10 wherein the guide ducts are arranged side by side, each guide duct communicating material directly to the feed opening of a respective one of the pipes and being formed by two side dividing walls separating each guide duct from the next adjacent guide duct and two end walls, the side dividing walls and end walls defining the receiving chamber at an upper end of the guide duct into which the material falls from the discharge end, the side walls being arranged in spaced relation transversely to the discharge end so that the discharged material is divided into separate portions for transmission to the pipes, the end walls of each duct member including at least one end wall which is inclined to the vertical to guide the separate portion of material from a position directly beneath the discharge end to a position aligned with the feed opening of the respective pipe.

* * * * *